May 17, 1938.  F. HARVEY  2,117,480
POWER DISTRIBUTION
Filed Feb. 3, 1936  3 Sheets-Sheet 1
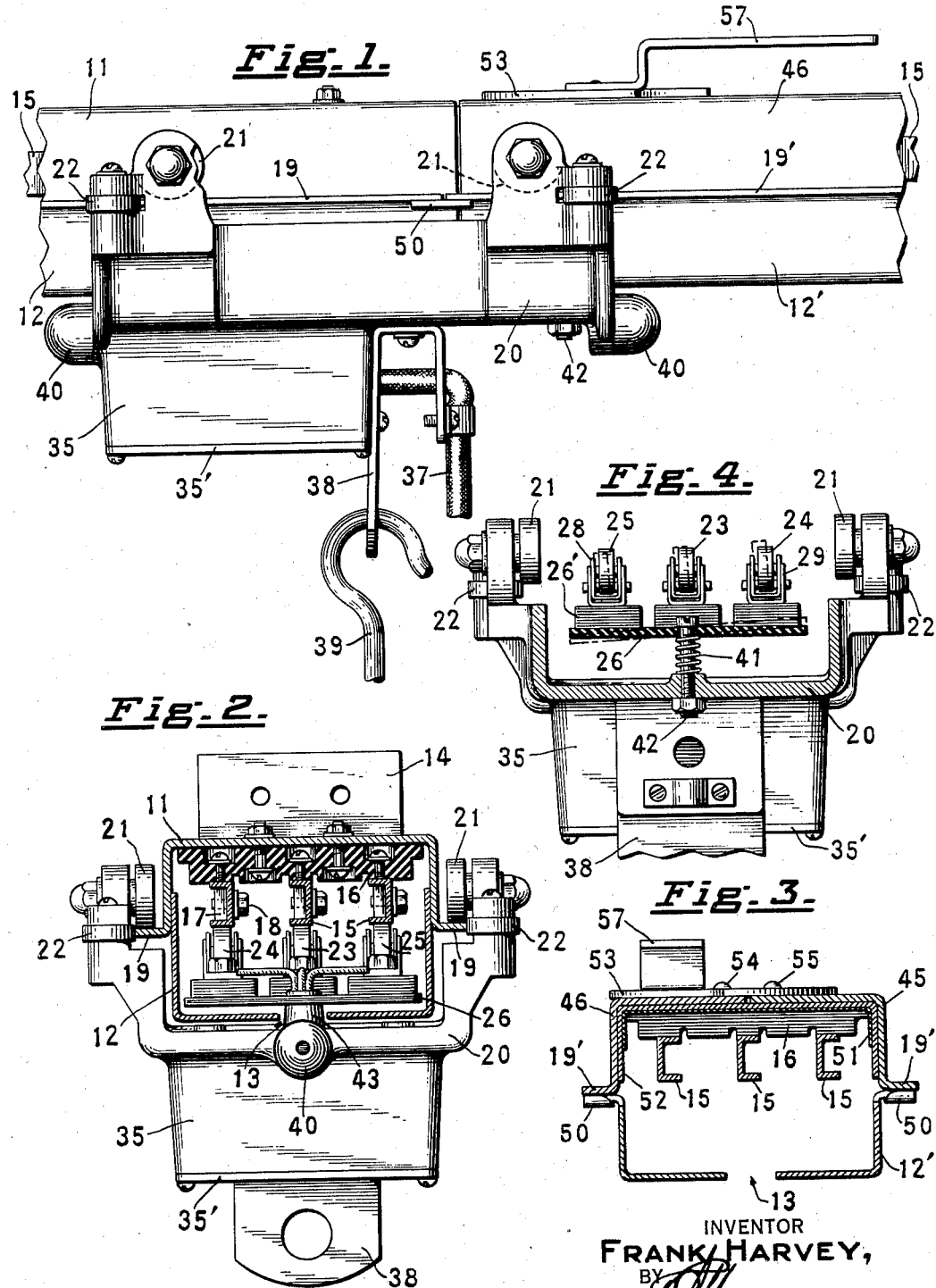
INVENTOR
FRANK HARVEY,
BY
ATTORNEY

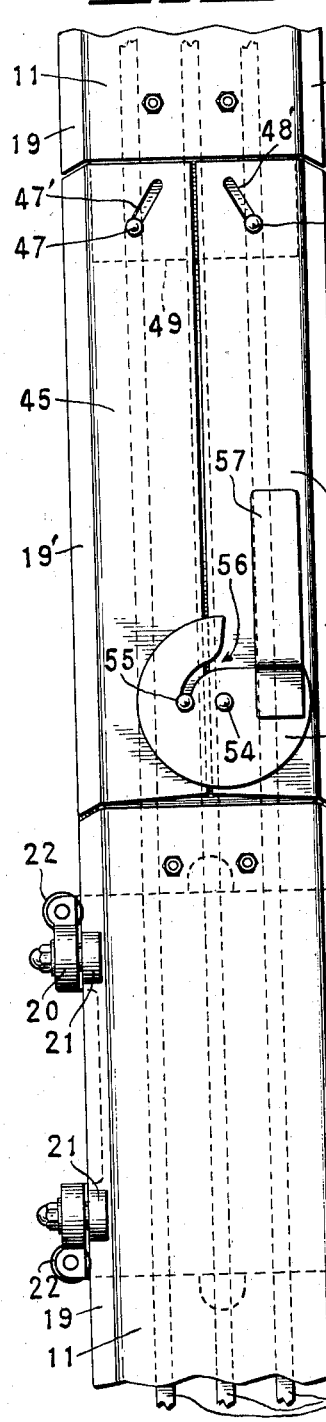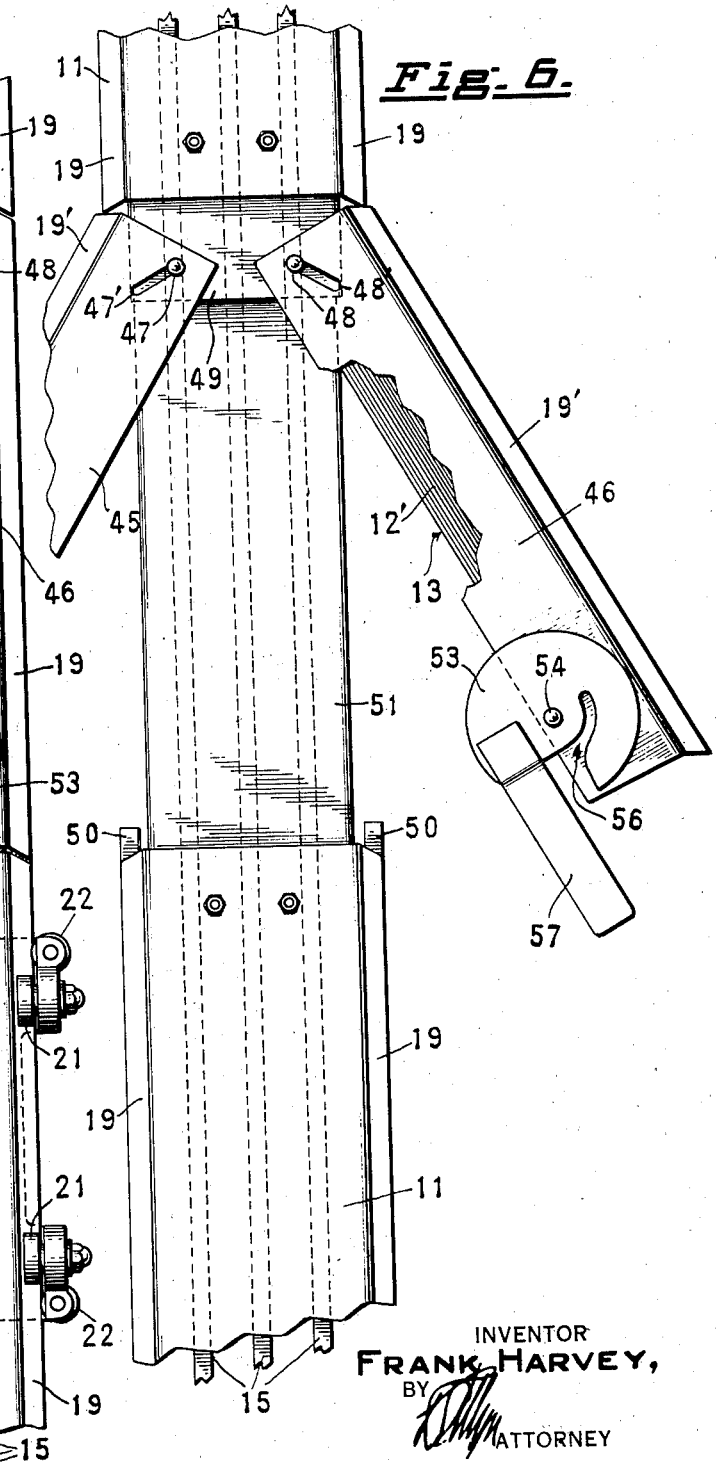

May 17, 1938.                F. HARVEY                2,117,480
                         POWER DISTRIBUTION
                        Filed Feb. 3, 1936           3 Sheets-Sheet 3
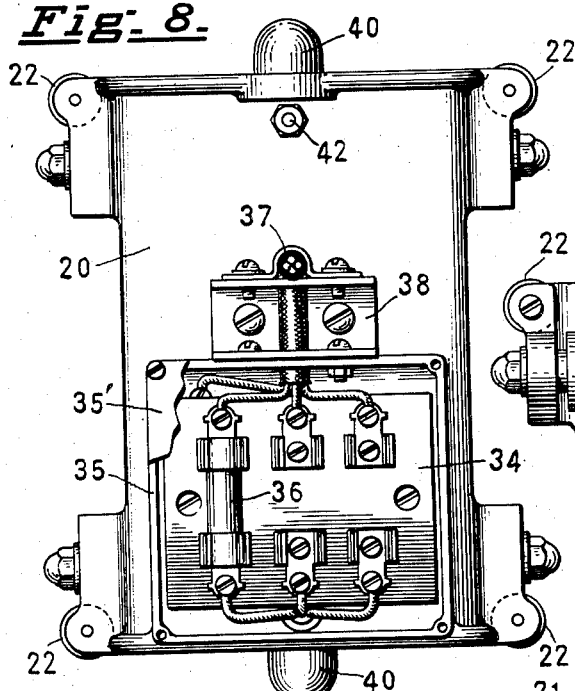
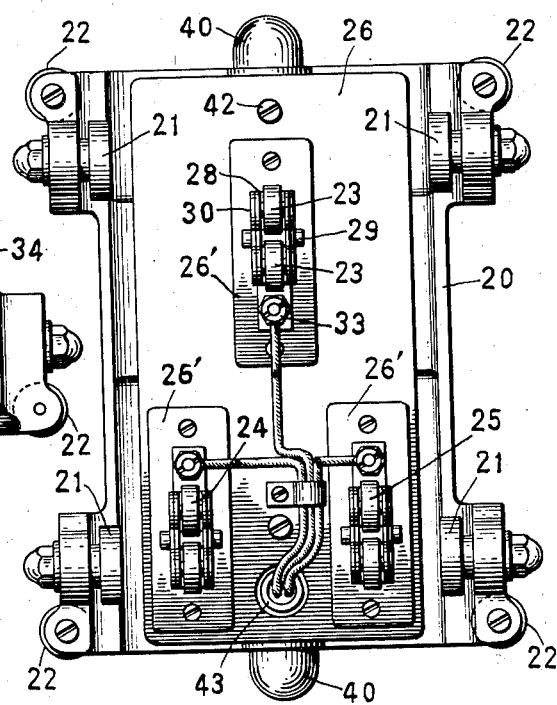
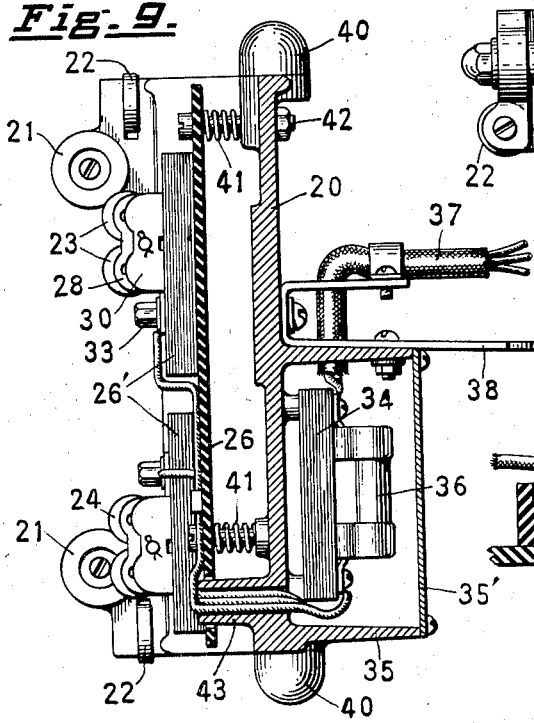
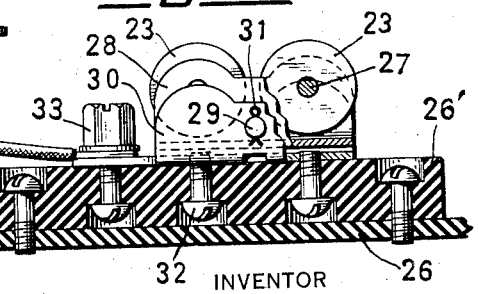
INVENTOR
FRANK HARVEY,
BY
ATTORNEY Patented May 17, 1938

2,117,480

UNITED STATES PATENT OFFICE 2,117,480

POWER DISTRIBUTION

Frank Harvey, Cincinnati, Ohio, assignor to The Trumbull Electric Manufacturing Company, Plainville, Conn., a corporation of Connecticut Application February 3, 1936, Serial No. 62,213

16 Claims. (Cl. 247—3)

My invention relates to conduit-protected bus bar systems from which current is conducted to portable tools and electrically actuated machines.

One object is to provide a system having a contact carrier which can be readily applied to or removed from the conduit or moved from place to place along the bus bars.

Another object is to ensure an effective travelling contact.

Another object is to provide a contact carrier which can be re-fused without removing the contact carrier from the conduit.

Another object is to simplify the construction of such contact carrier.

I accordingly provide a conduit or duct which entirely surrounds the bus bars except for a narrow slot allowed in the bottom for the passage of a part of the contact carriage. The contact rolls are tiltingly and resiliently mounted and press against the lower surfaces of the bus bars. A single pair of springs serve to keep all the contact rolls in engagement with the bus bars. The conduit has projecting side flanges or tracks which support the weight and the lateral thrust of the contact carrier.

At a convenient place the conduit is bifurcated and its hinged parts are adapted to swing outwardly to permit insertion and removal of the contact carrier.

The carrier is constructed with a recess for the fuses accessible beneath the conduit.

Details of the improvements will be seen in the drawings and referred to in the following specification.

Fig. 1 is a side view of a fragment of a conduit with its doors and a travelling contact carrier in place.

Fig. 2 is a cross sectional view of the conduit and carrier.

Fig. 3 is a cross sectional view showing a part of the doors without the carrier.

Fig. 4 is a sectional view of the carrier.

Fig. 5 is a top plan view of the conduit and carrier in place.

Fig. 6 is a top plan view of the conduit showing the doors open.

Fig. 7 is a top plan view of the contact carrier.

Fig. 8 is a bottom view of the carrier, parts being broken away to show a protecting fuse.

Fig. 9 is a longitudinal sectional view of the carrier.

Fig. 10 is a detail view of one of the contact members.

The conduit, housing or duct has a top member 11 of inverted channel form and a bifurcated lower member consisting of two angle plates 12 secured to the sides of member 11 and having a slot 13 between them. The conduit is supported by a number of hangers 14.

The bus bars 15 may be of any suitable character and number—in this case three. They are supported by insulating members 16 suitably constructed and spaced and supported in the top member of the conduit housing. Adjacent ends of bus bars may be united by splice pieces 17 and bolts 18.

The sides of the conduit are provided with flanges 19 which serve as tracks. The carriage 20 has supporting rollers 21 at each end and at each side and guide rollers 22 at each end and at each side and all of the rollers bear upon and are guided by the tracks 19, 19.

The contacts for each bus bar are formed by pairs of rolls 23, 24 and 25, all of which are carried by platform 26 which may be formed of insulating material and have insulating blocks 26' interposed beneath each pair of rolls. Each roll has a shaft 27 and the shafts of each pair are supported by a yoke 28 mounted on a pivot 29 so that it can tilt in the channel 30. The pivot 29 is held in place by a cotter pin 31. The channel is secured to the insulation 26' by a screw or screws 32.

A terminal 33 of each pair of contact rolls 23, 24 and 25 is connected by wire with a fuse terminal on the insulating support 34 mounted beneath the carriage 20 in a box 35 having a detachable cover 35' so that the fuses 36 may be reached by simply opening the box and without disturbing the contact rolls. The cable 37 is connected to fuse terminals in the box and anchored to a hanger 38 which is secured to the bottom of the carriage.

The hanger 38 also serves to support the weight of the tool etc. (not shown) which is hung from the hook 39.

Soft rubber bumpers 40 may be provided at each end of the carriage.

The platform 26 is supported by two springs 41, one at each end, mounted on bolts 42 which are anchored in the floor of the carriage. These are so arranged that the two springs act independently. The platform with the contact rolls can therefore be tilted endwise or sidewise to accommodate the contacts to irregularities in the bus bars and in the tracks and maintain good electrical connection.

The carriage has a tubular guide 43 for the conductor wires which pass through the floor of the carriage into the fuse box so as to prevent chafing the wires. The slot 13 is wide enough to allow for the passage of the springs 41 and the guide 43.

It will be obvious from the foregoing that the carriage with the contact rolls and guide rollers may be readily applied to the conduit at its open end. As it is highly desirable to be able to apply the carriage and its attached parts to the conduit at other points I construct sections of the conduit (at intervals of its length) in the form of swinging doors. Upper door sections 45, 46 are hinged to pins 47, 48 carried by a central extension 49 of the adjacent conduit member 11. Slots 47', 48' permit wide separation of the parts 45, 46. The lower sections 12', 12' correspond with the lower angle plates 12, 12 and are carried by the sections 45, 46. Lugs 50 serve to assist in supporting the outer ends of the sections 45, 46. An insulating cover 51 extends beneath the sections 45, 46. Adjacent sections of the upper member 11 may be connected by splice plates 52.

It is obvious that the contact carriage can be readily applied to the conduit when the doors are open as shown in Fig. 6 by simply pressing the contact rolls upwardly against the bus bars and compressing the springs 41, 41 and sliding the carriage along until the side guide rollers 22 at one end engage the edges of the tracks 19 and the supporting rollers 21 ride over the tracks 19. The door sections are then closed. The latch plate 53 is pivoted at 54 to one section 46 and is adapted to interlock with a pin 55 on the section 45 when the plate 53 is rotated from the position of Fig. 6 to that of Fig. 5.

The curved slot 56 serves as a guide to draw the parts together as the plate 53 is rotated by the handle 57. The door sections have side flanges 19' which are extensions of the tracks 19.

By means of the above described structures I am able to enclose the bus bars almost completely, saving the same from injury due to foreign materials and outside blows as well as protecting persons from inadvertent contact with the live parts of the distribution system. At the same time, the improved door structure permits easy application of the carriage to the conduit at any desired point, without lessening the available useful length of the conduit.

Another advantage of this structure is the elimination of any supporting strain on the bus bars. The weight of the entire power take-off structure is supported by the flanges on the conduit casing. The side guides insure substantial alignment of the bus bars and contact members at all times without straining the parts, and the rollers in these guides and supports facilitate movement of the carriage from one place in the system to another.

In the three-bar system shown, the "tripod" arrangement of the sets of contact rolls on the spring-pressed tilting supporting plate insures electrical contact of all three sets of rolls with the corresponding bars regardless of variations in the levels of the various bus bars.

The doubling of the contact rolls for each bus bar multiplies the contact area and the single pivot mounting of each set of rolls makes certain that both rolls of each set engage a bus bar.

Still another advantage resides in the simple spring mounting of the contact roll supporting plate. Because of the pair of single bolts with their surrounding springs a minimum width of the slot in the conduit housing is necessary. This increases the amount of protection given to the bus bars without interfering with efficient operation of the contact rolls.

The construction of the carriage so that it supports the fuses outside of the conduit and the function of the carriage as a tool hanger as well as a cable support greatly simplifies the operation of devices of this character. Besides, the easy accessibility of the fuse box from the outside of the carriage permits inspection and replacement of these protective devices without removing the carriage from the conduit.

The whole design produces a compact, simplified, and comparatively inexpensive bus bar system and contact carrier with a maximum flexibility to operating requirements.

I claim:

1. In a power distribution system, a bus bar conduit having a slot in the bottom and otherwise surrounding the bus bars and having laterally projecting side flanges forming tracks on the outer sides of the conduit, a carriage having contacts engaging the bus bars in the conduit and rollers supported on the tracks along the outer sides of the conduit and other guide rollers engaging the outside edges of the tracks and supports for the contacts extending through the slot in the bottom of the conduit.

2. In a power distribution system, a bus bar conduit having outside flanges forming tracks, a carriage having horizontal and vertical rollers guided on said tracks, a platform on the carriage inside the conduit having contacts engaging the bus bars, a fuse box beneath the carriage accessible without disturbing the contacts and a cable hanger connected to the fuse box.

3. In a bus bar conduit system, a carriage having contact rolls being arranged in pairs, a tilting yoke for supporting each pair of rolls and spring supported means for pressing all of the contact rolls against their respective bus bars.

4. In a power distribution system, a bus bar conduit having an upper member of inverted U-shape with outwardly projecting side flanges constituting tracks and angle plates secured to the sides of the upper member and leaving a slot between adjacent edges and a contact carriage having rollers on the tracks supporting the weight of the carriage and rollers at the edges of the tracks to guide the carriage laterally and contacts engaging the bus bars inside the conduit.

5. In a power distribution system, a bus bar conduit having external lateral tracks arranged in a certain plane and a central slot, and a carriage having contacts engaging the bus bars in the conduit and rollers supporting the carriage on the tracks, a section of the conduit with attached tracks being bifurcated and hinged to the adjacent part of the conduit to swing laterally about axes at right angles to the plane of the tracks to permit the conduit to be opened to admit application and removal of the carriage.

6. In a power distribution system, bus bars, a bus bar conduit having a slot in the bottom and otherwise surrounding the bus bars, flanges forming tracks on the outer sides of said conduit, a carriage having contacts engaging the bus bars in the conduit and rollers mounted on said carriage for riding on the flange tracks along the sides of the conduit, side guide rollers mounted on said carriage for engaging the side edges of the flange tracks, and a support for the contacts consisting of a plate, springs and posts positioning said springs and extending through the slot in the bottom of the conduit.

7. In a power distribution system, a bus bar conduit having a slot in one wall, and having external carriage supporting tracks, bus bars within said conduit, a carriage having a platform supported by a pair of springs to tilt in any direction within the conduit, contacts engaging the bus bars mounted on said platform, vertical and horizontal guide rollers on the carriage engaging the tracks on the conduit and a conductor guide bushing supported by the carriage, said platform supporting springs and conductor guide bushing on said carriage being disposed in alinement to provide for travel along said slot.

8. In a power distribution system, a bus bar conduit having an upper member of inverted U-shape with outwardly extending side flanges at the ends of said U constituting tracks, inwardly extending angle plates secured to the inner sides of the upper member leaving a slot between adjacent edges of said angle plates, bus bars within said conduit, a contact carriage having rollers riding on top of the tracks and supporting the weight of the carriage, rollers on said carriage bearing against the edges of the tracks to guide the carriage laterally, contacts engaging the bus bars inside the conduit, and means secured to said carriage and freely extending through said slot for supporting said contacts in engagement with said bus bars.

9. In a power distribution system, a bus bar conduit having external lateral tracks arranged in a common plane, bus bars within said conduit, a carriage having contacts engaging the bus bars in the conduit and rollers supporting the carriage on the tracks, a section of the conduit with attached tracks being bifurcated and hinged to an adjacent part of the conduit to permit the conduit to be opened in the plane of the tracks to admit application and removal of the carriage, means for locking said bifurcated portion in closed position, whereby said carriage may be supported by said portion, and lugs on said conduit for supporting the free ends of said bifurcated portion when the same is closed.

10. In a bus bar conduit system, a carriage having vertical and horizontal supporting and guiding rollers and a spring supported platform, contact rolls arranged in pairs and tilting yokes carried by the platform and each carrying two contact rolls engaging the bus bars.

11. A bus bar conduit having an upper section with side flanges and outwardly extending tracks and angle plates secured to the sides of the upper section and leaving a slot between the angle plates.

12. A bus bar conduit having an upper section with side flanges and outwardly extending tracks and angle plates secured to the sides of the upper section and leaving a slot between the angle plates, a portion of the upper section being divided and hinged to open laterally in the plane of the tracks.

13. A bus bar conduit having an upper divided section with hinged sides and depending angle plates leaving a slot between them, and swinging about axes perpendicular to the plane of the slot and a contact carriage insertable endwise into the conduit when the divided section is open.

14. A trolley contactor for a bus bar conduit system including a box having branch circuit connections, supporting and guiding rollers at each end of the box for coacting with exterior flanges on the bus bar conduit, a contact carrying plate supported by a spring and guide post at the center of each end of the box permitting the plate to tilt laterally and longitudinally with respect to the box and a contact carried by said plate at each side thereof to press against bus bars in the conduit.

15. A trolley contactor for a bus bar conduit system including a box having branch circuit connections, supporting and guiding rollers at each end of the box for coacting with exterior flanges on the bus bar conduit, a contact carrying plate supported by the box, a contact carried by said plate at each side of the longitudinal center thereof for engaging the bus bars in the conduit, spring means for pressing said plate and its contacts at right angles to the plane of the supporting rollers and guide means for extending through a slot in the center of the conduit and permitting the plate and its contacts to tilt laterally within the conduit.

16. A trolley contactor for a bus bar conduit system including a box having branch circuit connections, supporting and guiding rollers for coacting with exterior flanges on the bus bar conduit, a contact carrying plate, a contact carried by said plate at the center and at each side of the longitudinal center of the box for engaging three bus bars in the conduit, spring means for pressing said plate and its three contacts at right angles to the plane of the plate and guide means for extending through a slot in the center of the conduit and permitting the plate and its contacts to tilt within the conduit.

FRANK HARVEY.